(12) United States Patent
Worrell et al.

(10) Patent No.: US 7,891,699 B2
(45) Date of Patent: Feb. 22, 2011

(54) AIRBAG MODULE COVER

(75) Inventors: Barry C. Worrell, Centerville, OH (US); Francis Joseph Holmes, Beavercreek, OH (US); Harold W. Morgan, Miamisburg, OH (US); David G. Greensien, Beavercreek, OH (US); Dan J. Lestingi, Vandalia, OH (US); Mark T. Winters, Troy, OH (US)

(73) Assignee: Autoliv Development AB, Vargarda (SE)

( * ) Notice: Subject to any disclaimer, the term of this patent is extended or adjusted under 35 U.S.C. 154(b) by 23 days.

(21) Appl. No.: 12/433,391

(22) Filed: Apr. 30, 2009

(65) Prior Publication Data

US 2009/0273165 A1 Nov. 5, 2009

Related U.S. Application Data

(60) Provisional application No. 61/049,424, filed on Apr. 30, 2008.

(51) Int. Cl.
*B60R 21/20* (2006.01)
(52) U.S. Cl. .................................. 280/728.3; 280/731
(58) Field of Classification Search ................ 280/731, 280/728.3
See application file for complete search history.

(56) References Cited

U.S. PATENT DOCUMENTS

| 5,762,365 | A | 6/1998 | Worrell et al. | |
|---|---|---|---|---|
| 6,099,027 | A * | 8/2000 | Shirk et al. | 280/728.3 |
| 6,193,267 | B1 * | 2/2001 | Tichvon et al. | 280/728.2 |
| 6,443,483 | B2 * | 9/2002 | Ellerbrok | 280/728.3 |
| 7,159,897 | B2 | 1/2007 | Worrell et al. | |
| 2009/0315306 | A1 | 12/2009 | Worrell et al. | |

OTHER PUBLICATIONS

RD407017, Mar. 1998.*

* cited by examiner

*Primary Examiner*—Faye M. Fleming
(74) *Attorney, Agent, or Firm*—Harness, Dickey & Pierce P.L.C.

(57) ABSTRACT

A cover for a driver's side airbag module is provided, the cover having a central body portion with an opening disposed therein, the central body portion having a predetermined tear seam for defining a pair of deployable doors, the predetermined tear seam extending through the opening. The cover also includes a horn switch assembly inserted into the opening; and a tether secured to the horn switch assembly, the tether retaining the horn switch assembly with the cover after deployment of the pair of deployable doors along the predetermined tear seam, wherein the horn switch assembly is dislodged from the opening when the pair of deployable doors deploy along the predetermined tear seam.

22 Claims, 10 Drawing Sheets

AIRBAG MODULE COVER

CROSS REFERENCE TO RELATED APPLICATIONS

This application claims the benefit of U.S. Provisional Patent Application No. 61/049,424, filed Apr. 30, 2008 the contents of which are incorporated herein by reference thereto.

BACKGROUND OF THE INVENTION

Exemplary embodiments of the present invention relate generally to airbag module covers and more specifically, exemplary embodiments of the present invention relate to an emblem or horn switch integrated into a cover of a driver's airbag module.

Existing horn switches in automobiles can be positioned underneath the airbag module, such that the horn can be actuated by an operator pressing a cover of the airbag module for moving the airbag module against the horn switch. This packaging can have a significant gap between the airbag module and the steering wheel, as well as expensive horn mechanization. Other horn switches are provided by discrete buttons positioned outboard of the airbag module cover (e.g., on or near opposing spokes of the steering wheel).

Therefore, it is desirable to provide an actuator for a horn of a vehicle, such that the actuator can be readily accessed and operated. Additionally, it is desirable to provide a cover of an airbag module that is efficiently packaged within a steering wheel for reducing manufacturing costs. It is further desirable to provide a method for securing an emblem and a horn switch to a cover of an airbag module, such that the horn can be quickly activated and that the horn can have substantially low manufacturing costs.

SUMMARY OF THE INVENTION

A cover for a driver's side airbag module is provided in accordance with one exemplary embodiment of the present invention, the cover having a central body portion with an opening disposed therein, the central body portion having a predetermined tear seam for defining a pair of deployable doors, the predetermined tear seam extending through the opening. The cover also includes a horn switch assembly inserted into the opening; and a tether secured to the horn switch assembly, the tether retaining the horn switch assembly with the cover after deployment of the pair of deployable doors along the predetermined tear seam, wherein the horn switch assembly is dislodged from the opening when the pair of deployable doors deploy along the predetermined tear seam.

In accordance with another exemplary embodiment a driver's side airbag module is provided, the driver's side airbag module having an inflator; an inflatable cushion being positioned in the airbag module in an un-inflated state for inflation by the inflator; a cover for the airbag module, the cover having a central body portion having an opening disposed therein, the central body portion having a predetermined tear seam for defining a pair of deployable doors, the predetermined tear seam extending through the opening; a horn switch assembly inserted into the opening; and a tether secured to the horn switch assembly, the tether retaining the horn switch assembly with the cover after deployment of the pair of deployable doors along the predetermined tear seam, wherein the horn switch assembly is dislodged from the opening when the pair of deployable doors deploy along the predetermined tear seam.

In still another embodiment, the horn switch assembly is replaced with an emblem or a control element.

The above-described and other features of the present disclosure will be appreciated and understood by those skilled in the art from the following detailed description, drawings, and appended claims.

DRAWINGS

DETAILED DESCRIPTION OF THE INVENTION

Figure 1:
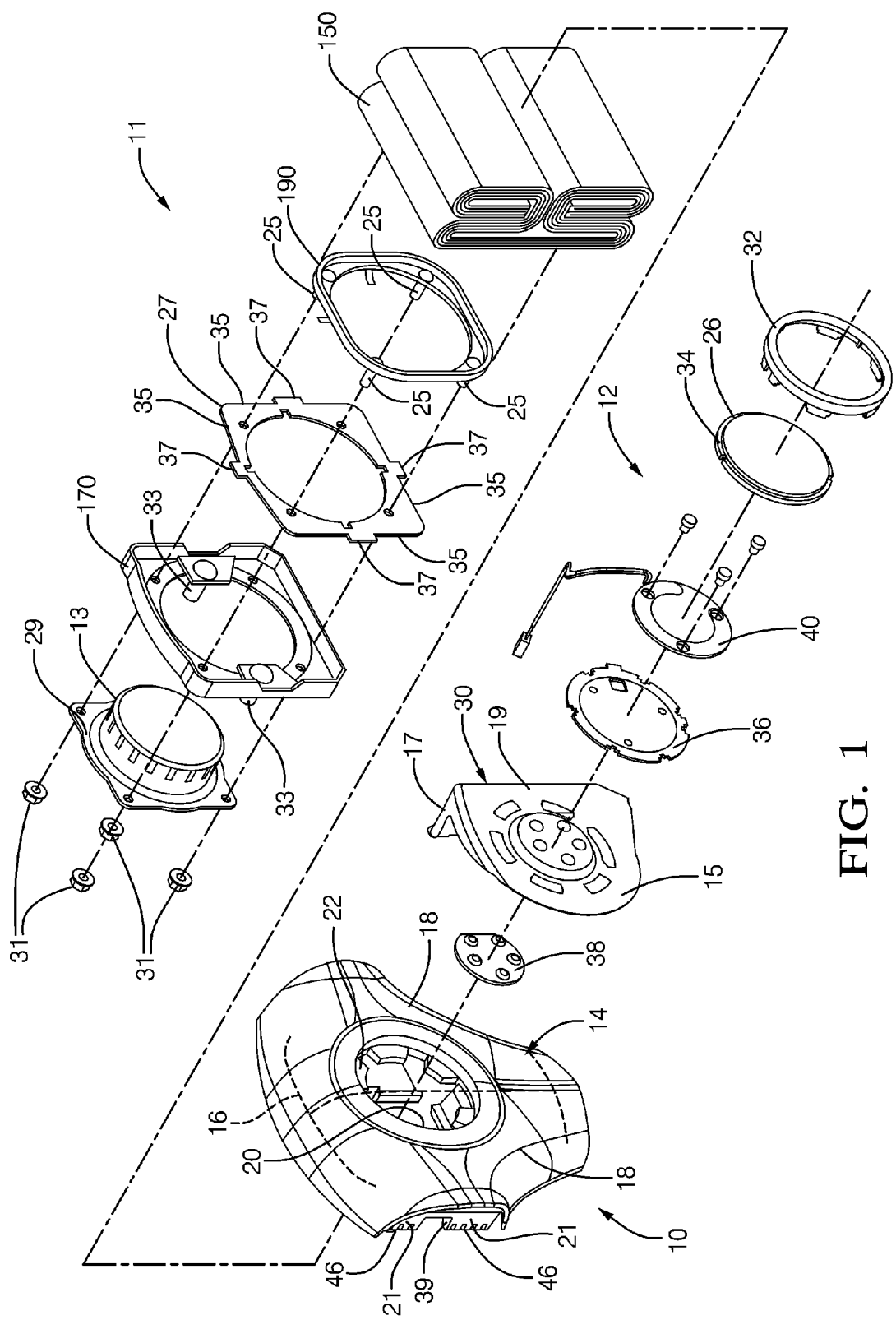
FIG. 1 is an exploded view of a cover for an airbag module having a horn switch assembly for a horn, in accordance with an exemplary embodiment of the present invention.

Exemplary embodiments of the present invention are directed to a cover of an airbag module with an emblem or horn actuator secured therein. Other exemplary embodiments are related to a tether for use in securing the emblem or tether to the cover. In accordance with an exemplary embodiment of the present invention the cover has a pair of deployable portions each defining a central opening in the cover for the emblem or horn actuator or horn switch assembly to be inserted therein. As used herein deployable portion is intended to refer to portions of the cover that separates from other portions of the cover during deployment of an airbag module located behind the cover. In addition, and while these portions separate from each other during deployment they also remain secured to the cover at other sections to provide a deployable door or doors that allow an inflatable cushion of the airbag module to deploy therethrough. As used herein, the cover is intended to refer a cover of a driver's side airbag module typically mounted in the center of a steering wheel. The deployable portions are integral portions of the cover of the airbag module, wherein the entire deployable portion remains with one portion of the cover after it has separated due to the activation of an airbag module disposed behind the cover.

In accordance with one exemplary embodiment of the present invention, the horn actuator or horn switch assembly has: an emblem; a bezel inserted within an opening located within the cover, the bezel movably secures the emblem to the cover such that the emblem is capable of movement between a first position and a second position with respect to the bezel, wherein the second position of the emblem causes activation of the horn. In an exemplary embodiment, a tether is secured to the bezel at one end and a portion of the cover at another end such that the bezel and/or the emblem remains tethered to the cover during deployment of an airbag module disposed behind the cover (e.g., emblem or horn switch assembly becomes dislodged from the opening during deployment of the airbag module). A non-limiting description of such a horn actuator is found in U.S. Provisional Patent Application Ser. No. 61/015,520 filed Dec. 20, 2007 and U.S. patent application Ser. No. 12/339,816 filed Dec. 19, 2008, the contents each of which are incorporated herein by reference thereto.

In these non-limiting exemplary embodiments, the actuator includes an emblem with a circular, oval or other configurations and a decorative surface movably secured to a bezel secured to a center or central portion of the cover of the airbag module. However, it is contemplated that the emblem can have various other shapes and be positioned on other suitable portions of the cover as styling dictates.

Referring now to FIGS. 1-4, a cover 10 for an airbag module 11 having a horn switch assembly 12 for a horn of a vehicle is provided. The airbag module having an inflator 13 for inflating an inflatable cushion 15 of the airbag module. The cover includes a decorative outer layer 14 having a predetermined tear seam 16 illustrated by dashed lines. The predetermined tear seam defining a pair of deployable door portions 18 that deploy when the inflatable cushion is inflated by the inflator. The cover further comprises a recessed opening or an opening 20 for receiving the horn switch assembly therein. Although the illustrated dashed lines of the tear seam pass through opening 20 there is no actual seam in opening 20 as opening 20 is disposed between end portions of the tear patterns. The depiction of the dashed lines in the figures is provided to show that opening 20 comprises a portion of the opening that will define the deployable doors of the cover and therefore, the item secured in opening 20 is retained proximate to the cover by a tether secured thereto to allow for deployment of the doors of the cover while retaining the item (e.g., horn switch, emblem, control element, etc.) in close proximity to the cover.

In the illustrated embodiment, the opening 20 is defined by a peripheral ledge portion 22 recessed from a show surface 24 of the cover. The peripheral ledge portion having a plurality of openings 26 for receiving a plurality of tabs 28 of the horn switch assembly therein, the tabs securing the horn switch assembly to the cover. The recessed opening is bounded by a side wall such that the entire bezel or a portion thereof when secured therein is received within the recessed opening. In one exemplary embodiment, the bezel has a rim portion with a surface that is flush with show surface 24. Alternatively, the surface of the bezel slightly protrudes from the cover.

As illustrated in FIG. 1, the inflatable cushion 150 is secured to a backing plate 170 via a retaining ring 190 such that an opening of the inflatable cushion is disposed over inflation openings of the inflator. As is known in the related arts, the retaining ring is typically disposed inside the inflatable cushion proximate to an inflation opening of the inflatable cushion and a plurality of threaded studs 25 pass through openings in the inflatable cushion, a mounting plate 27, backing plate 170 and a flange 29 of the inflator. Thereafter, a plurality of nuts 31 engage the threaded studs and the inflatable cushion 150, retaining ring 190, mounting plate 27, backing plate 170 and inflator 13 are all secured together to provide a portion of the airbag module. In this configuration, a portion of the inflatable cushion is sandwiched between retaining ring 190 and mounting plate 27.

Backing plate 170 further comprises mounting studs 33 for securing the assembled airbag module to a vehicle or vehicle steering wheel armature as is known in the related arts. Mounting plate 27 has a peripheral edge 35 that is engaged by features (e.g., engagement portions 46 or other equivalent features) of walls 21 of cover 10 and features 37 of the peripheral edge of the mounting plate are received in openings 39 defined between engagement portions 46 of the cover, wherein variations in the size and configurations of openings 39 and features 37 ensure that cover is correctly orientated and installed to the mounting plate 27 thus providing a correctly assembled airbag module. In one exemplary embodiment, engagement portions 46 are configured to engage the peripheral edge 35 of mounting plate 27.

It is, of course, understood that the aforementioned airbag module configuration and securement of the inflatable cushion to the inflator is provided as an exemplary example and other equivalent means of securement, configurations and constructions are contemplated to be within the scope of exemplary embodiments of the present invention.

The predetermined tear seam will provide a weakened area of the cover that separates or provides the doors during activation of the airbag module when the inflatable cushion is inflated by the inflator. In one non-limiting exemplary embodiment, the predetermined tear seam is a groove formed in an inner surface of the cover. Accordingly and in order to retain the horn switch assembly with the cover, a tether 30 is secured to the horn switch assembly at one end and the other end is secured to the cover in order to retain the horn switch assembly with the cover when the deployable doors open. Alternatively, the other end is secured to a steering wheel that the cover is secured to.

In accordance with an embodiment of the present invention a bezel portion 32 of the horn switch assembly is merely "snap fitted" into the opening by passing tabs 26 into openings 24 while tether 30 secures the horn switch assembly to the cover.

The bezel movably secures an emblem 34 to the decorative outer layer, such that the emblem is capable of movement between first and second positions with respect to the bezel and other components of the horn switch assembly as will be discussed herein. For example, the rim portion of the bezel is configured such that the emblem will be able to move within the bezel however, an edge of the rim portion will engage an overturned edge of the emblem such that the emblem cannot pass through an opening defined by the rim portion. During this movement the emblem causes activation (e.g., closing) of one or more horn switches or pairs of conductive traces separated from each other on a non-conductive pad positioned on a flexible circuit as the emblem is moved from the first position to the second position.

In one embodiment, the tether will comprise a backing plate mounting portion 15, a securement portion 17 and a leg portion 19 interconnecting the backing plate mounting portion and the securement portion, the backing plate mounting portion having a plurality of openings configured to receive a portion of the plurality of stakes extending from a backing plate 36 of the horn switch assembly. The mounting portion being secured between the backing plate 36 and mounting plate 38 secured to the backing plate. Disposed between backing plate 36 and the emblem is a circuit board 40.

Figure 2:
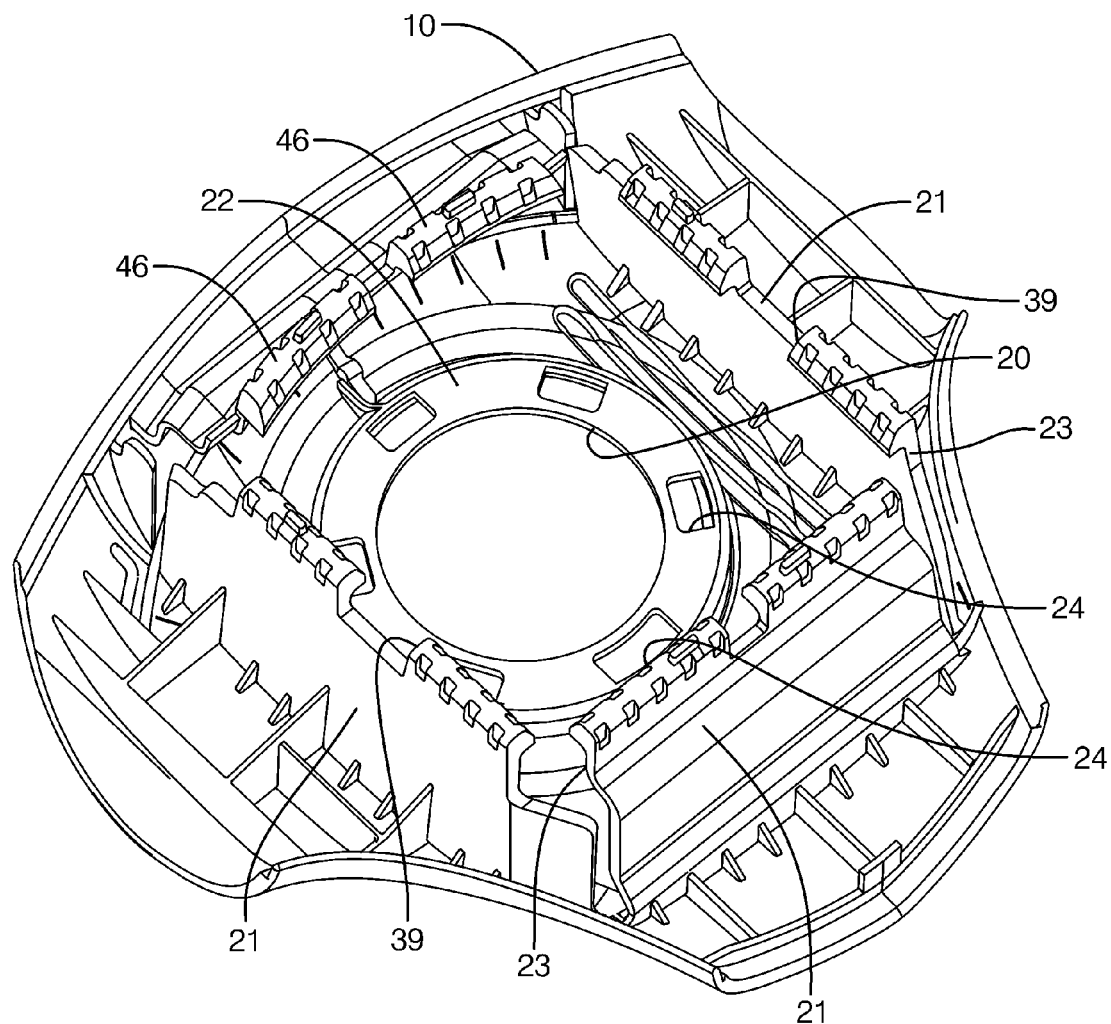
FIG. 2 is a bottom perspective view of the cover of FIG. 1.
Figure 3:
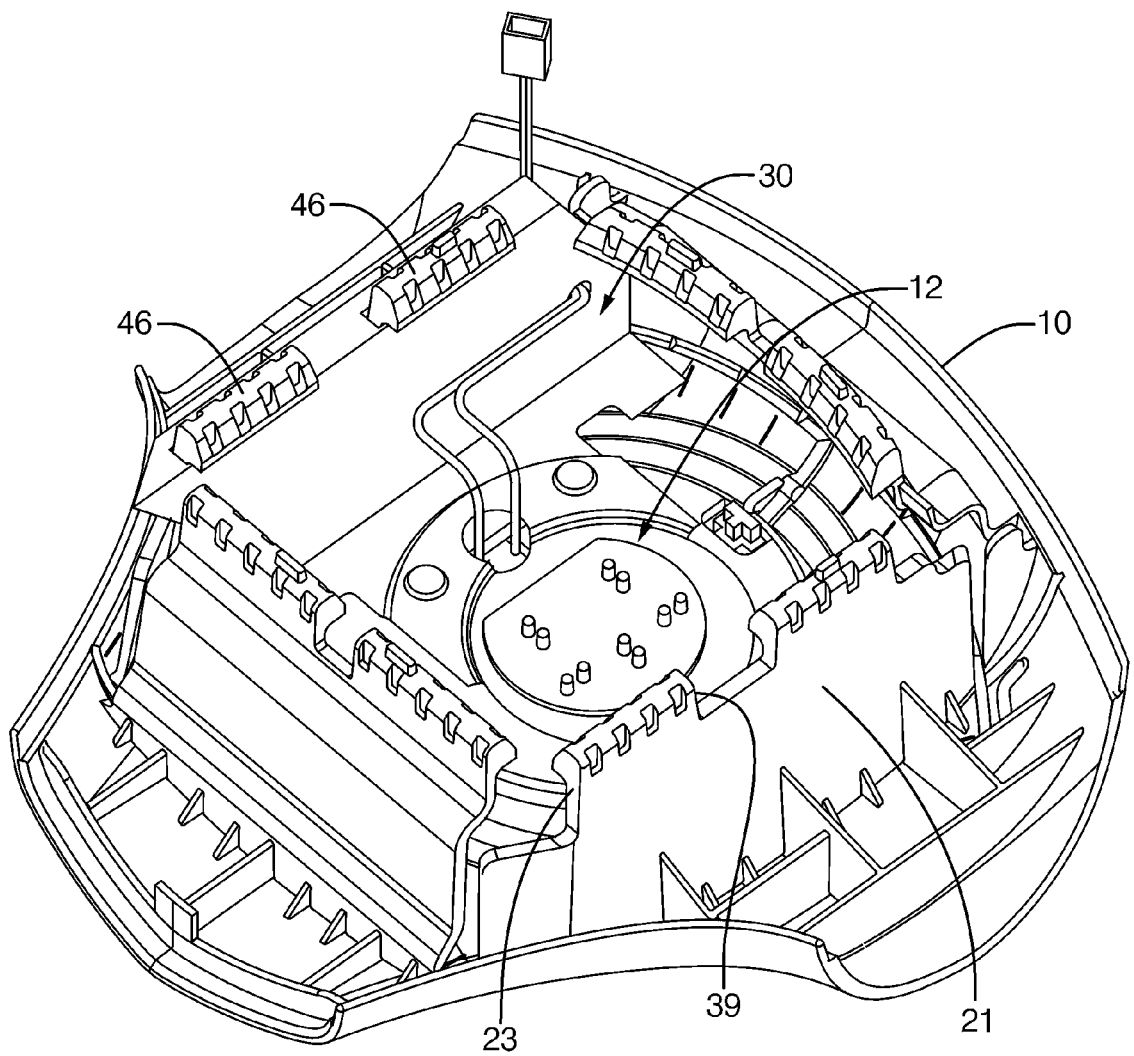
FIG. 3 is a bottom perspective view of the cover of FIG. 1 with the horn switch assembly secured therein.
Figure 4:
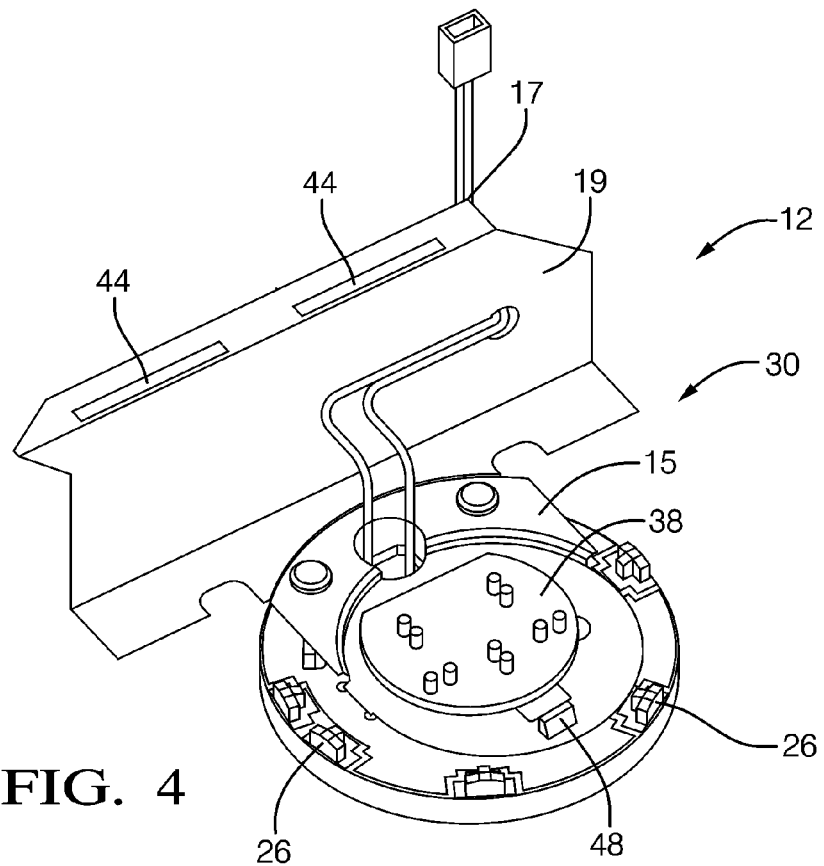
FIG. 4 is a perspective view of the horn switch assembly of an exemplary embodiment of the present invention.
Figure 5:
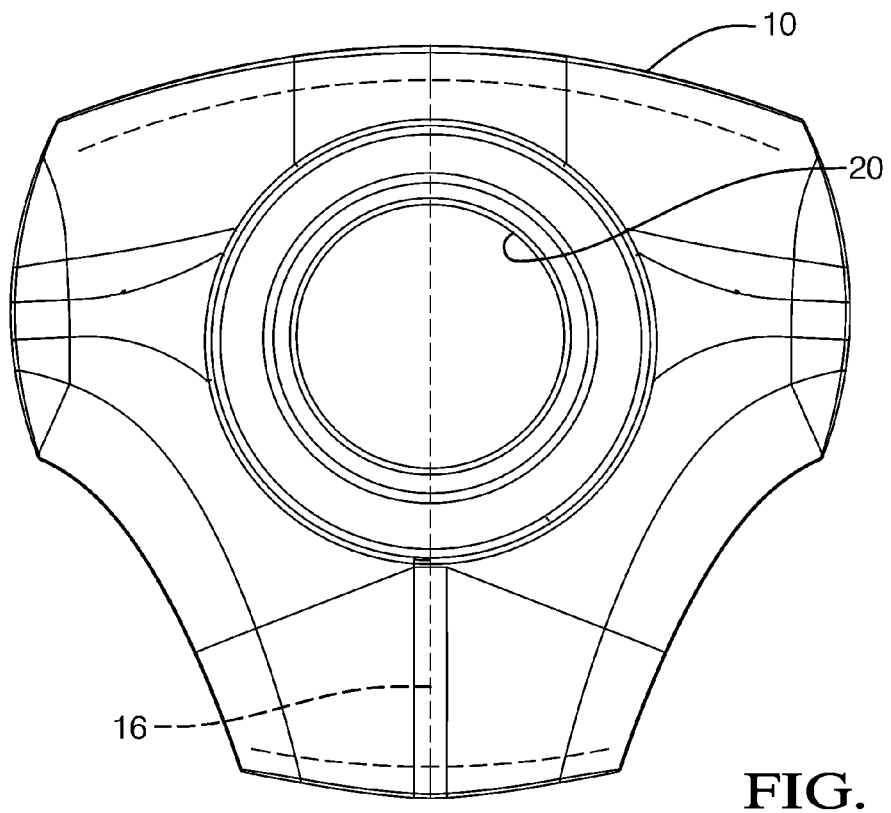
FIG. 5 is a top plan view of a cover in accordance with an exemplary embodiment of the present invention.

Referring now to FIGS. 1-3, the cover has at least a pair of internal side walls 21 (See at least FIGS. 2 and 3) and an opening 23 disposed between the pair of internal side walls, which in one embodiment a portion of the tether is passed through the opening. In one non-limiting embodiment, the cover will have four or two pairs of side walls each having an opening therebetween for receipt of the leg portion of the tether therein.

The mounting plate 38 is secured to the backing plate 36 by a securement process (e.g., welding, adhesives, combinations thereof or other securement process) wherein stake portions of the backing plate 36 are secured to the mounting plate 38 and mounting portion 15 of the tether is secured therebetween.

In accordance with an alternative exemplary embodiment of the present invention, the bezel includes a rim portion having one or more raised surfaces extending therefrom configured to slide within one or more notches of the emblem, respectively. In one exemplary embodiment, the raised surfaces extend from an inner periphery of the rim portion of the bezel. Accordingly, the emblem is movable between the first and second positions without rotating with respect to the bezel (e.g., the raised surfaces slide within notches). In addition, the location of the raised surfaces and the notches align protrusions of the emblem with the switches of the horn circuit as well as provide a means for error proof assembly. In other words, the notches and protrusions prevent the emblem from being incorrectly installed within the bezel while also preventing rotational movement thereof when the emblem is moved within the bezel. It is contemplated that in an alternative embodiment, the raised surfaces can instead be configured (e.g., curved) to cause rotation of the emblem on the bezel or be omitted as desired.

Deployment of the airbag causes the predetermined tear seams of the cover to tear while the horn switch assembly remains attached to the cover through the use of the tether.

The circuit board (flexible or otherwise) is disposed between a lower surface of the emblem and the backing plate 36. As will be discussed herein, the lower surface of the emblem will have a plurality of protrusions extending therefrom to cause the switches of the circuit board to be closed in order to complete the horn activation circuit and enable the horn to activate as the switch is closed by movement of the emblem within the bezel. The circuit board is coupled to a circuit configured to activate the horn of the vehicle when the emblem is moved to the second position and closes at least one of three horn switches disposed on the circuit board. It is contemplated that the circuit board can have more or less than three horn switches as desired.

In one non-limiting exemplary embodiment, the circuit board will comprise a plurality of conductive traces separated from each other on a non-conductive pad and wherein a conductive member of a biasing member is manipulated towards the conductive traces by movement of the emblem and contact of the conductive member or pad to the conductive traces causes the circuit to be complete thereby actuating the horn.

The circuit board in one alternative embodiment also includes a source of illumination. One non-limiting exemplary embodiment of a source of illumination is a light emitting diode or a plurality of light emitting diodes. In this embodiment, the emblem and the biasing member are made of a translucent material, such that the source of illumination is visible through the emblem when the source of illumination is illuminated. Accordingly, the emblem may be back lighted when the vehicle lights are on or alternatively the emblem can light up when the horn is activated. A non-limiting example of the source of illumination is one or more light emitting diodes mounted to the circuit board. The circuit board further comprises a terminal in electrical contact with the switches at one end and a horn and other required components (e.g., power supply etc.) at the other wherein closing of one of the contact switches will cause the horn to activate.

The actuator further includes a biasing member or members or springs configured to bias the emblem toward the first position. In one exemplary embodiment, the biasing member is made of an elastomer layer disposed in the cavity between the circuit board and the lower surface of the emblem. The elastomer layer in one non-limiting embodiment has three conductive contact pads configured to close at least one of the three horn switches (e.g., conductive traces disposed on a non-conductive pad) when the emblem is moved from the first position toward the second position thus closing the circuit and actuating the horn. In one embodiment, the pads have a conductive contact surface configured to engage a respective pair of separated conductive traces and act as a switch and close the circuit (e.g., bridge the gap between the conductive traces) when it is manipulated toward the conductive traces. In addition, the conductive pads extend from and are attached to a flexible protrusion that extends away from the switch and provides the biasing force to a complimentary protrusion extending from the emblem. In one non-limiting exemplary embodiment, the conductive contact pads are positioned on a feature that extends from the flexible protrusion. It is further contemplated that the elastomer layer can have more or less than three contact pads for closing the horn switches.

In yet another alternative embodiment, the conductive traces on the circuit board are replaced with a micro-switch or other equivalent device that is closed when the emblem is moved toward the circuit and opened when the emblem is biased back away from the circuit by the biasing member.

In addition and in one non-limiting exemplary embodiment, the biasing member has a plurality of locating features for receipt in corresponding openings in the flexible circuit board. The locating features will ensure that contact pads of the elastomer layer are positioned over the conductive paths or switches of the circuit board.

In accordance with an exemplary embodiment of the present invention, the emblem further comprises a plurality of protrusions that extend from an inner surface of the emblem the protrusions are configured to engage the flexible biasing protrusion of the elastomer layer in order to close the circuit by applying the conductive pads to the conductive paths of closing the switches as the emblem is moved from the first position to the second position thus depressing the biasing protrusions and the contact pads towards a pair of isolated contact paths of the circuit board.

The protrusions extend from an inner surface of the emblem and in one embodiment are aligned with the flexible protrusion and contact pads, and the switches via the notches and protrusions. In addition and in one embodiment, the elastomer layer further comprises a protruding area that provides an area that covers the illuminating members (e.g., leds) and other circuit components of the circuit board. In this embodiment, the elastomer layer will be translucent so that the light of the illuminating members passes through the elastomer layer and backlights the emblem.

In accordance with an exemplary embodiment of the present invention, the flexible protrusions of the elastomer layer provide a biasing force to the emblem via the protrusions to bias the emblem back into the first position. In addition, the contact pads and/or the protruding area provide a shock absorbing feature during deployment of the airbag module wherein contact of the emblem against a hard surface (e.g., steering wheel rim) will prevent the shattering of the emblem.

In one non-limiting exemplary embodiment, the elastomer layer is formed from a silicone material that is not temperature dependent for providing the desired biasing force or spring rate to the emblem.

Non-limiting exemplary materials for the bezel and the backing plate are those that can withstand impacts at high temperatures and low temperatures examples include polycarbonate (PC), acrylonitrile butadiene styrene (ABS), polypropylene, PCABS blend and equivalents of any of the foregoing and non-limiting exemplary materials for the emblem include but are not limited to metal (e.g., stamping, die casting, etc.) or polycarbonate, clear polycarbonate for back lighting, ABS, polypropylene, PCABS blend and equivalents thereof.

In one non-limiting exemplary embodiment, the material used for the mounting plate 38 and the backing plate 36 are the same in order to facilitate the welding (e.g., ultrasonic, heat staking, equivalents thereof, etc.) or securement of the two materials together. In one exemplary embodiment the material for the bezel and the backing plate 36 will be a polycarbonate. In yet another exemplary embodiment, the material for the bezel and the backing plate 36 will be a silicone modified polycarbonate. Furthermore and in accordance with an exemplary embodiment of the present invention the bezel and the backing plate 36 are formed from a material that has a high elongation at low temperatures one non-limiting example of such a material is currently available under the trademark or trade name LEXAN or LEXAN EXL available from SABIC. This material can withstand high impacts and has ductility at low temperatures as compared to standard PC grades.

In one exemplary embodiment, the material for the bezel and the backing plate 36 has approximately 18% elongation at −35 degrees Celsius. In accordance with an exemplary embodiment of the present invention the materials for the backing plate 36, tether and bezel need to pass deployment criteria wherein the actuator will remain attached to the cover during deployment.

For example, one non-limiting exemplary embodiment contemplates a silicone modified polycarbonate (e.g., a material such as LEXAN EXL or equivalents thereof) for the bezel and the backing plate 36, a polycarbonate or a PCABS for the emblem, an elastomer made of silicone for the biasing member and nylon for the tether.

If necessary, the materials contemplated for the tether are similar to those for an inflatable cushion (e.g., nylon or equivalents thereof).

In an alternative exemplary embodiment, the horn switch assembly is replaced with an emblem only, wherein the securement of the emblem is typically the same however, there is no circuit board for a horn switch although the emblem may be back-lighted. Regardless of whether a horn switch or merely an emblem is employed, the tether secures the same to the cover. Referring now to FIGS. 3, 4, 7, 10a, 10b and 12a-12d, alternative exemplary embodiments are illustrated wherein the tether has at least one opening or pair of openings 44 for engaging a mounting portion or portions 46 of the side walls of the cover. The mounting portions 46 secure the cover to a backing plate 27 fixedly secured to an armature of the steering wheel and thus with the tether openings positioned around the mounting portions, one end of the tether will remain fixedly secured to the steering wheel armature during deployment of the airbag module wherein the deployable door portions open and the emblem and/or a horn switch assembly becomes dislodged from the opening in the cover the tether keeps the emblem and/or horn switch assembly tethered to the steering wheel and/or cover. Accordingly, and in order to secure the emblem or horn switch assembly to the cover the mounting portion of the tether is passed through opening 20 and the emblem or horn switch is snapped into the cover over opening 20 wherein tabs 48 engage a peripheral portion of opening 20 and tabs 26 are received in openings 24 and openings 44 are positioned over engagement features 46 of the side walls 21 of the cover and the cover is secured to the mounting plate 27 thereby securing the tether to the airbag module. Here an end portion of the tether proximate to openings 44 passes through openings 23 located between the sidewalls 21. In accordance with an exemplary embodiment the end portion of the tether secured to the cover is fastened thereto without any mechanical fasteners (e.g., loops or openings are positioned around wall portions or mounting portions of the cover) thus the tether provides a simple means for securing the emblem and or horn switch assembly to the cover.

Figure 8A:
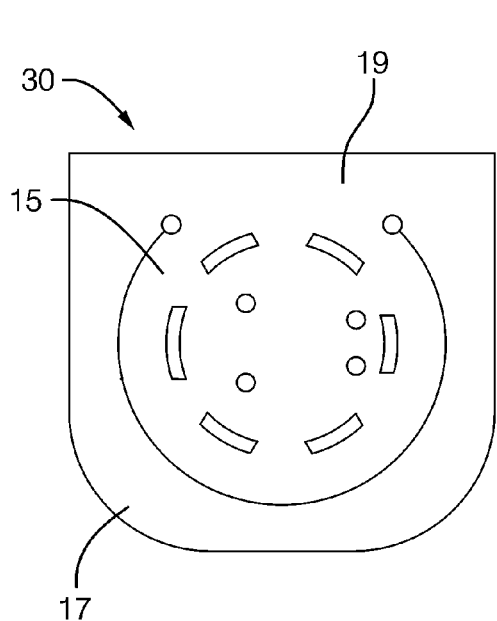
FIGS. 8A-8C illustrate a tether in accordance with an alternative exemplary embodiment of the present invention.
Figure 8B:
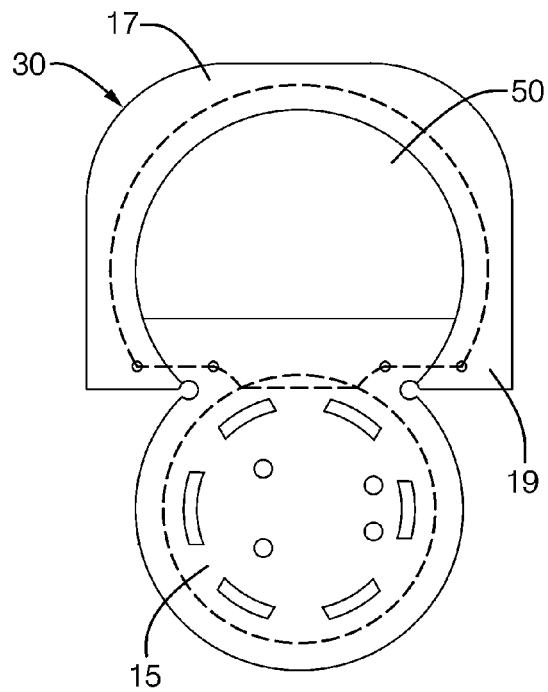
Figure 8C:
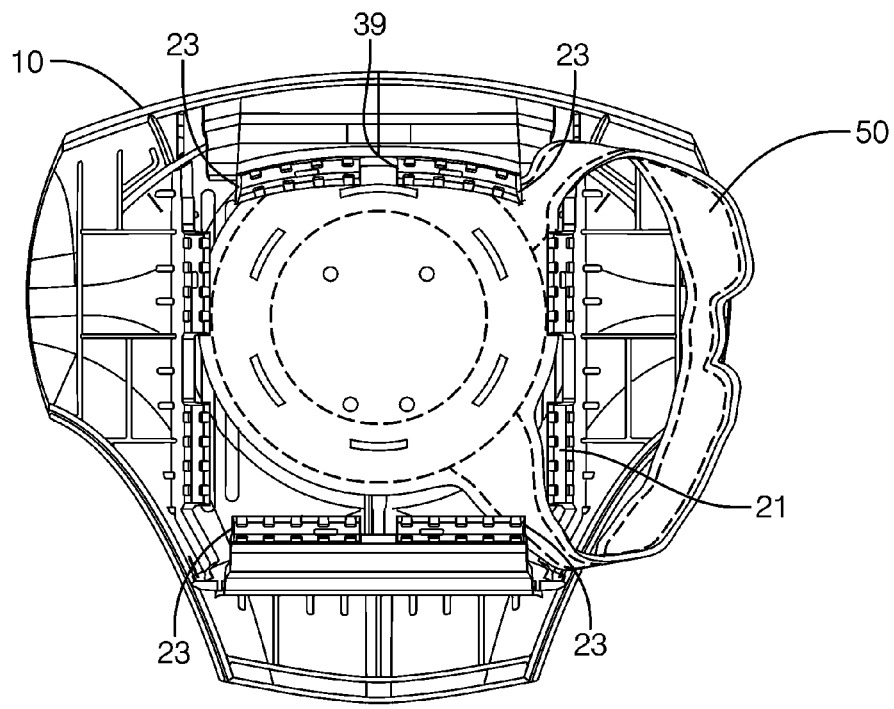
Figure 9A:
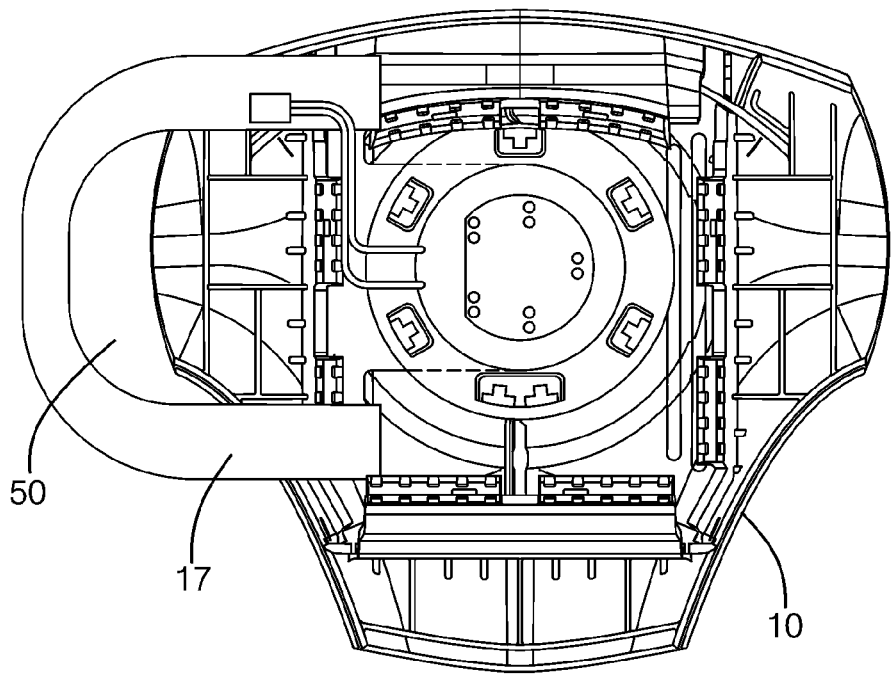
FIGS. 9A-9B illustrate a tether in accordance with still another alternative exemplary embodiment of the present invention.
Figure 9B:
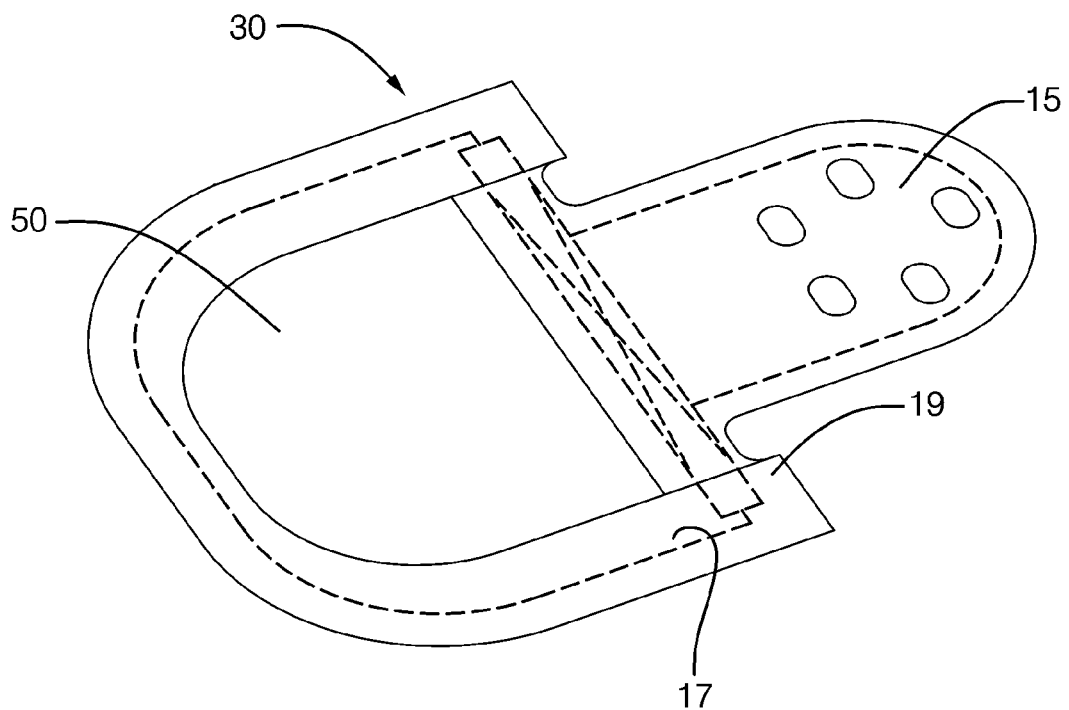
Figure 10A:
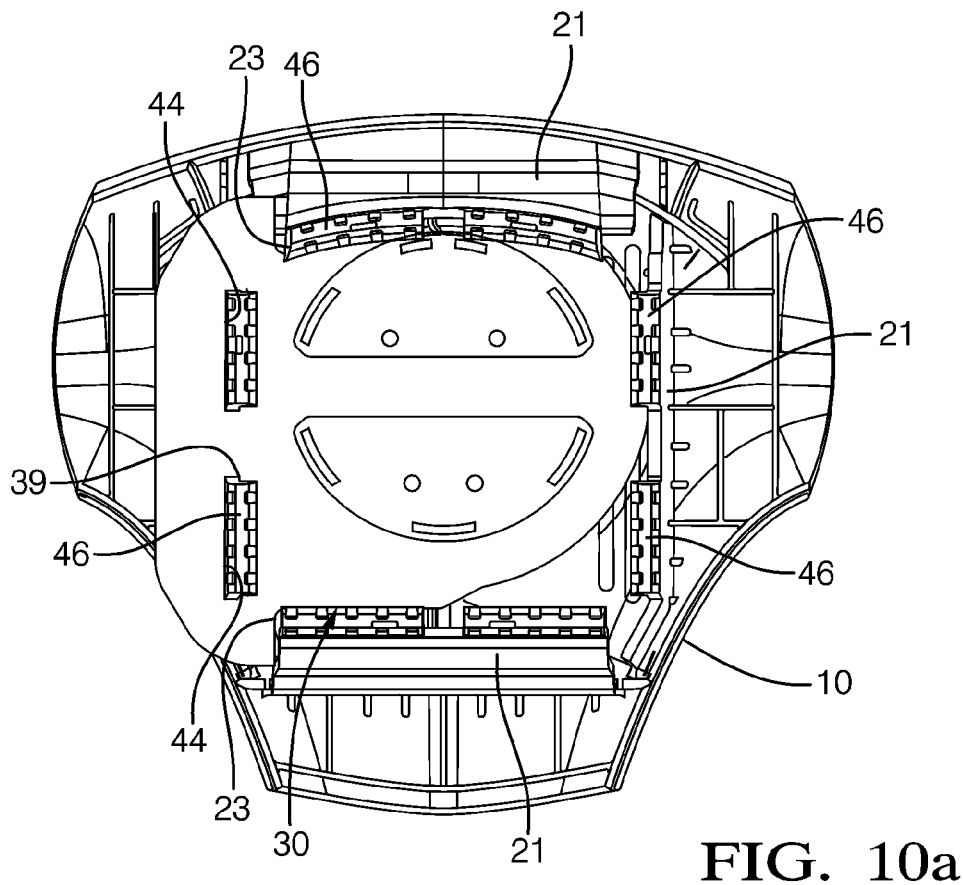
FIGS. 10A-10B illustrate a tether in accordance with still another alternative exemplary embodiment of the present invention.
Figure 10B:
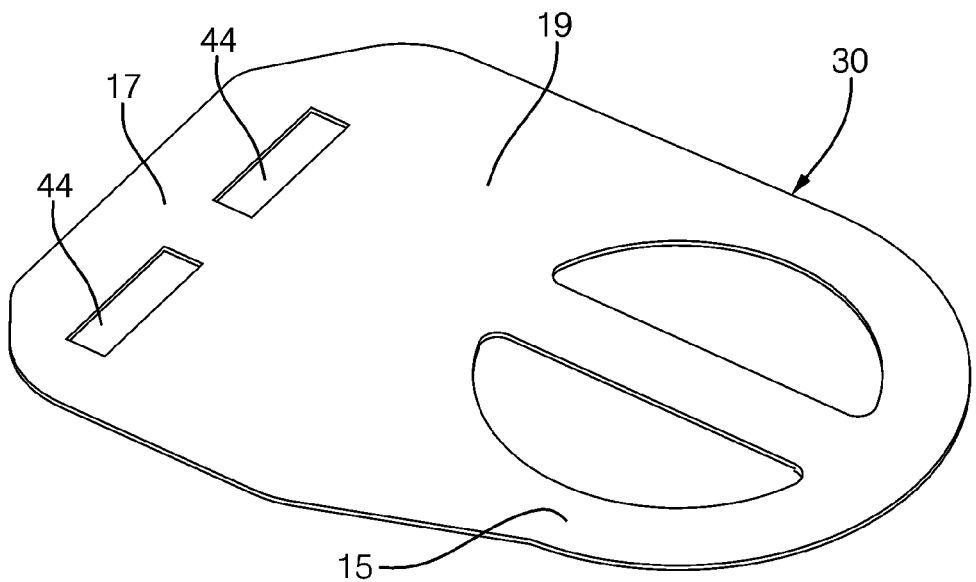
Figure 11A:
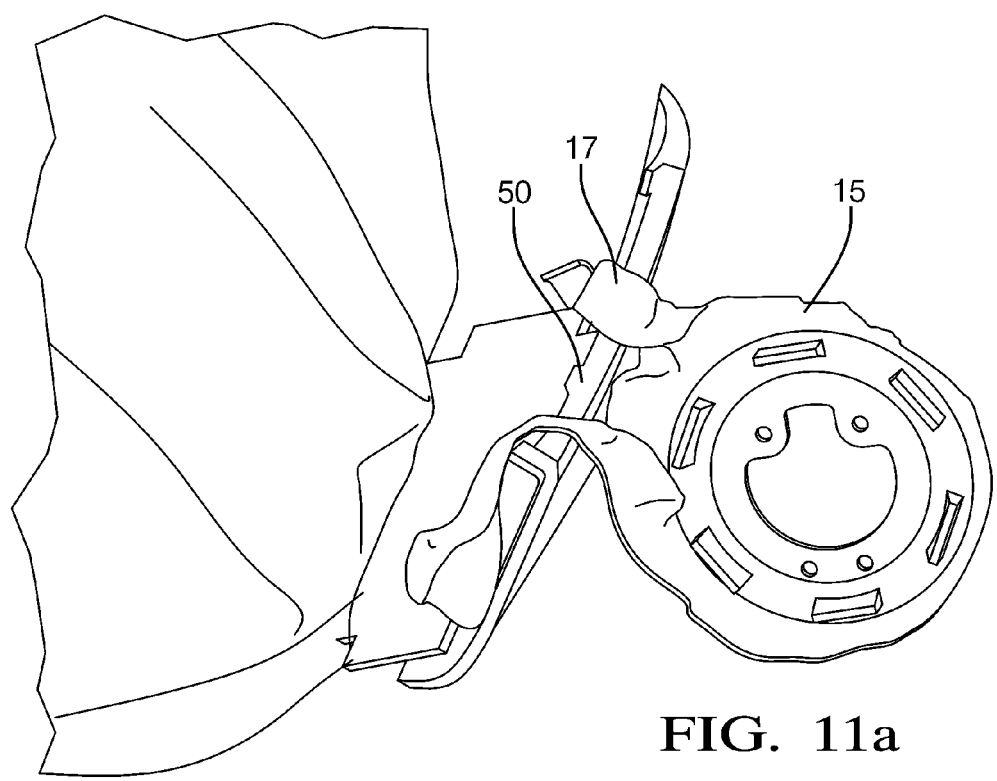
FIGS. 11A-11B illustrate a deployed cover of an exemplary embodiment of the present invention.
Figure 11B:
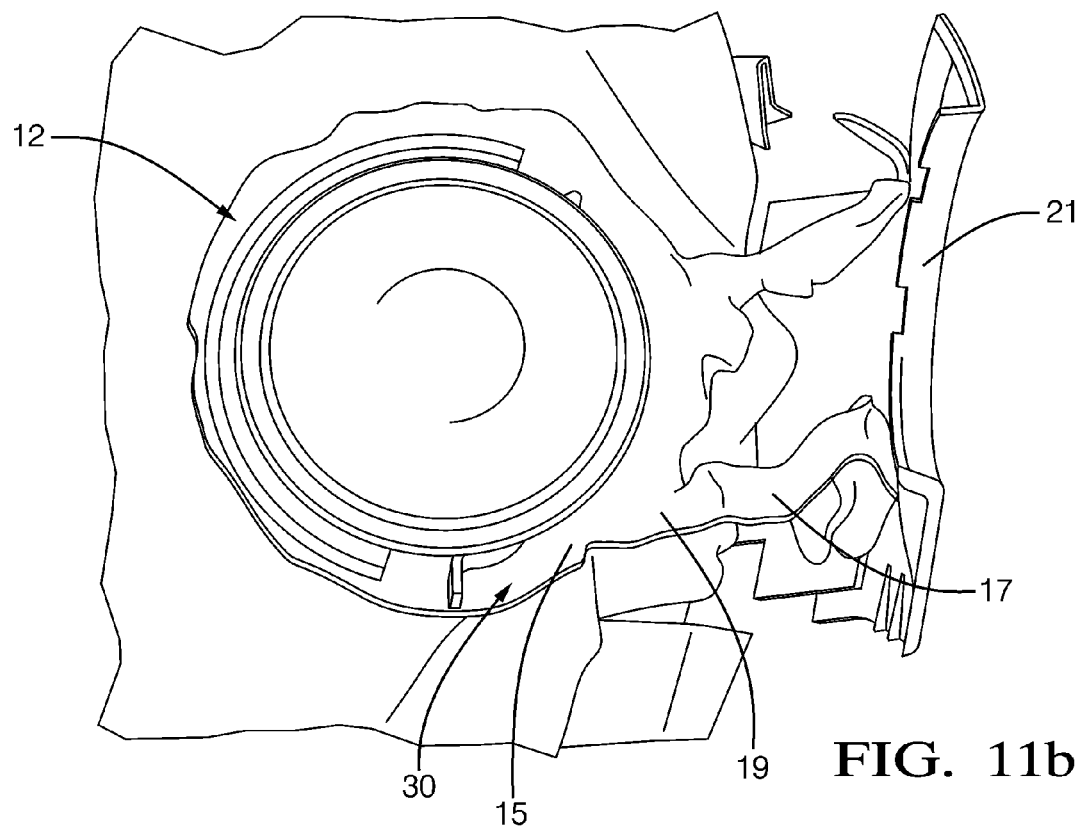

Referring now to FIGS. 8a-9b other alternative exemplary embodiments of the present invention are illustrated for example in FIGS. 8a-8c, the securement portion 17 of the tether is cut from around the mounting portion 15 to define a loop portion having an opening 50. Here the opening 50 of the loop portion is disposed around a pair of side walls or one side wall 21 by passing through the openings 23 between the side walls to retain the emblem or horn switch with the cover during deployment of the cover. The closed loop is locked in place by the assembly of the driver's side airbag module where mounting portion or portions 46 of the side walls engage the mounting plate 27 or steering wheel armature thus locking the loop of the tether to the airbag module that is secured to the steering wheel by virtue of the fact that the loop is passed around the sidewalls 21 before they are secured to the mounting plate. This embodiment also gives an extended length to the legs of the tether wrapped around the side wall 21, wherein the extended length unfurls when the airbag deploys (e.g., extending the effective length of the tether). FIGS. 9a-10b illustrate still other tether configurations while FIGS. 11a-11b illustrate a deployed cover wherein the tether retains the emblem or horn switch with the cover.

Figure 12A:
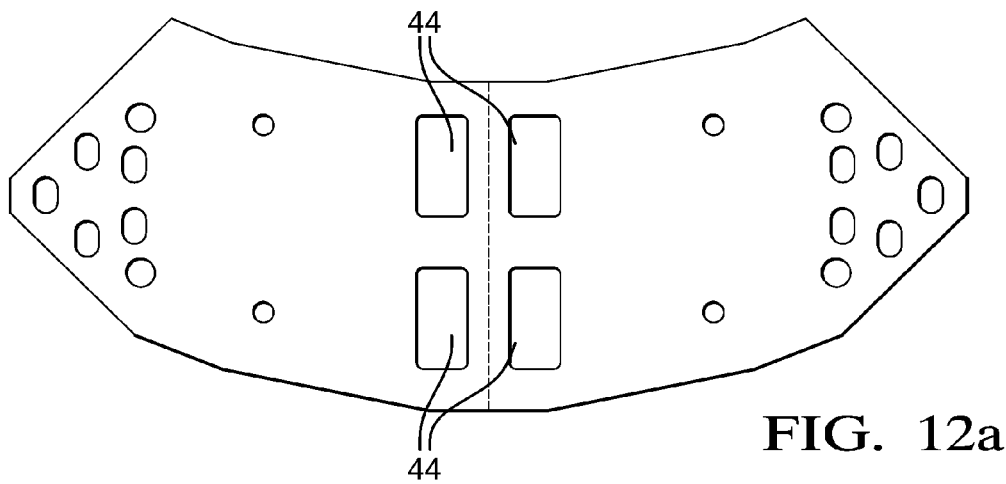
FIGS. 12A-12D illustrate a tether in accordance with still another alternative exemplary embodiment of the present invention.
Figure 12B:
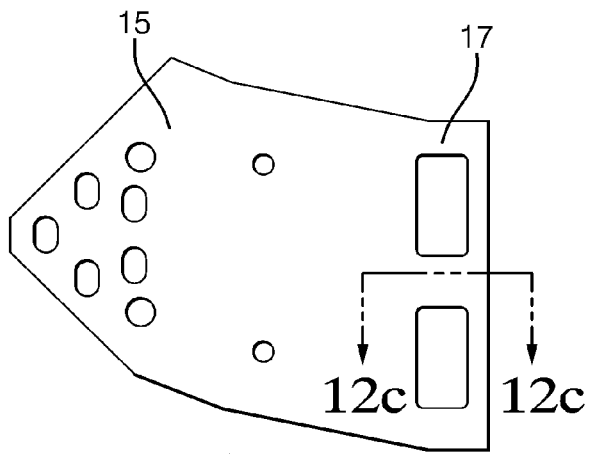
Figure 12C:
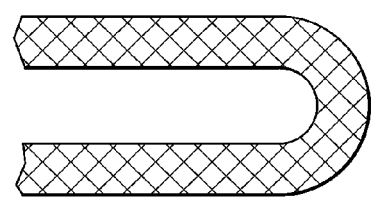
Figure 12D:
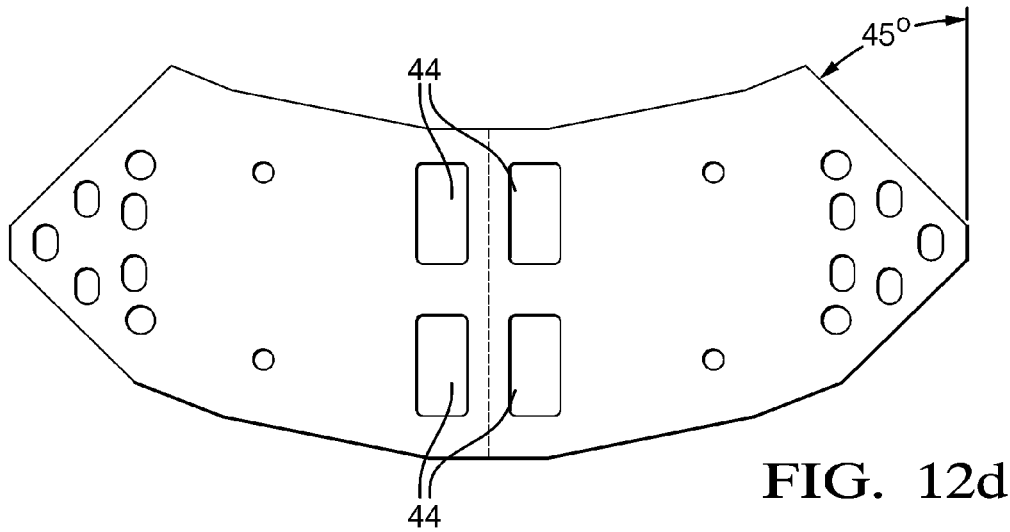

FIGS. 12a-12d illustrate still another tether configuration wherein the tether 30 is formed cutting a piece of fabric folding it in half (FIG. 12b). In addition, the pattern of the tether has profiles and edges to maximize the nesting of the pattern on a sheet to minimize waste when the tethers are cut from the sheet.

Figure 6:
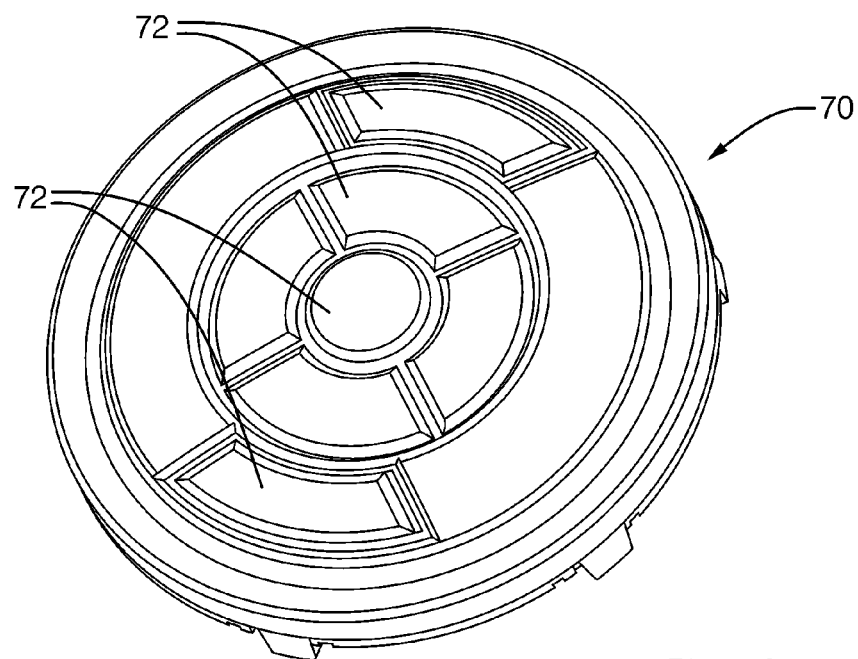
FIG. 6 is a top perspective view of another exemplary embodiment of the present invention.
Figure 7:
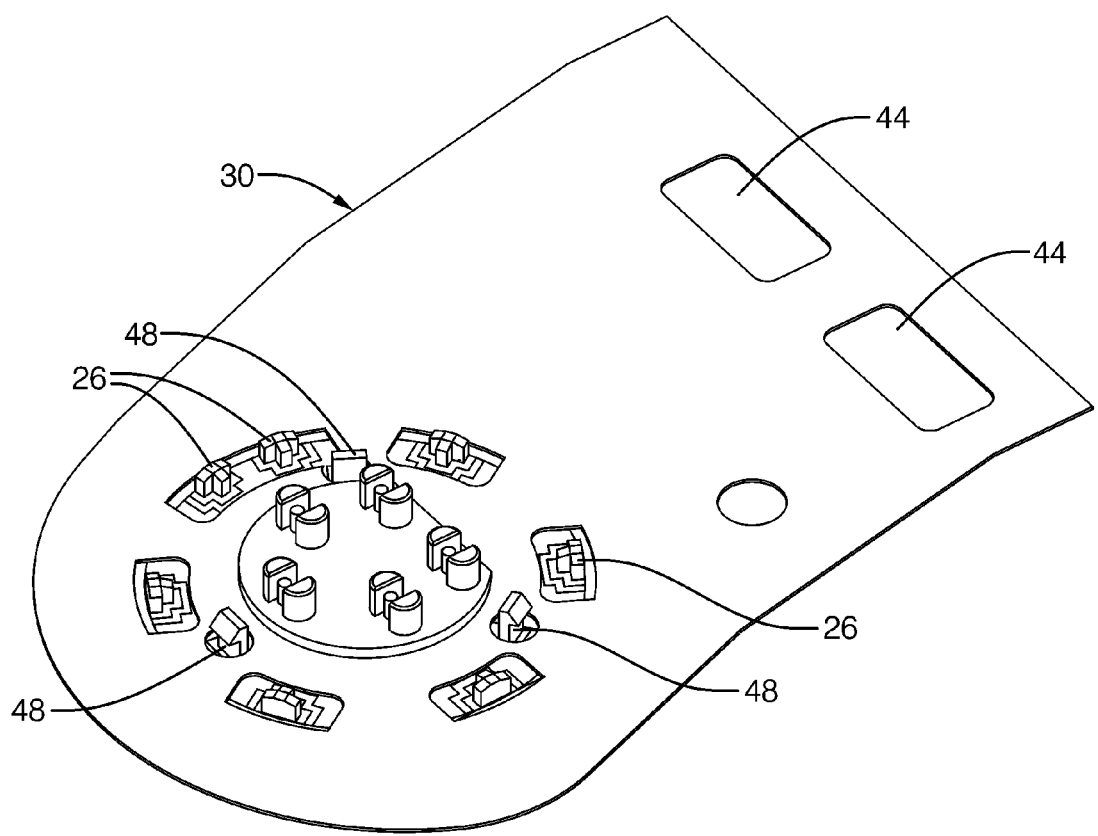
FIG. 7 is a bottom perspective view of a horn switch assembly with a tether secured thereto.

FIG. 6 illustrates another exemplary embodiment, wherein the emblem or horn switch assembly is replaced by a control element 70 similarly secured to the tether wherein the control element has a plurality of switches, actuators, buttons, or interfaces 72 for controlling features of the vehicle (e.g., radio, cruise control, etc.). For example, an elastomer switch can be insert molded into the bezel to provide control element 70. In any of the aforementioned embodiments, the horn switch assembly, emblem or control element can be provided or manufactured as a preassembled subcomponent (with or without tether secured thereto) and then snapped into the front of the airbag cover into opening 20. As discussed above, one end of the tether is fixedly secured to the subcomponent snapped into the opening and the other end of the tether is routed through the front of the cover along with any necessary lead wires, wherein this end of the tether is secured to the cover by for example looping it over one of the side walls (e.g., through openings 23 between side walls 21, then the cover is secured to the mounting plate 27). The subcomponent (e.g., emblem, horn switch assembly, control element, etc.) is held proximate to the module or an airbag backing plate with the tether such that during deployment the emblem, horn switch assembly, control element etc. is pushed out of the pocket and/or opening by the deploying inflatable cushion while the tether ensures that the same remains secured to the cover. A deployed inflatable cushion and deployed cover with the subassembly secured to the cover by the tether is illustrated in FIGS. 11a and 11b.

The following features/benefits are provided by exemplary embodiments of the present invention: the cover assembly is lighter as there is less weight, less packaging space and the emblem or horn switch is not attached permanently to the cover except through the use of tether 30; the cover can have the emblem, switch, sensor or back lighted component easily inserted into an opening of the cover; the opening of the cover is part of the tear seam such that the airbag opens through center of an opening and the opening requires less break out force. The opening in the cover also allows the routing of a tether from the front face of the cover through the cover thus allowing the tether to access the back side of the cover for securement of that end of the tether; the opening of the cover allows for center gating of the cover during an injection molding process; the opening of the cover allows the connected tear seams to be thicker since the opening natural propagates the tearing from the center of the cover; and exemplary embodiments allow for pre-assembly of the front loading component (e.g., emblem, sensor, back lighted component) thus providing more manufacturing options without additional cost.

In accordance with an exemplary embodiment of the present invention the cover has a permanent central opening in the cover and the emblem tether is fed through the opening then the emblem is snapped into cover. Moreover, the tear seam can go through the opening allowing further deployment options.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cover for a driver's side airbag module, the cover comprising:
    a central body portion having an opening disposed therein, the central body portion having a predetermined tear seam for defining a pair of deployable doors, the predetermined tear seam extending through the opening;
    an object inserted into the opening, the object including a bezel having a rim portion having a first surface and a second surface and a plurality of tabs extending from the second surface, the plurality of tabs passing through complementary openings in a peripheral portion of the opening and the first surface is flush with an exterior surface of the cover when the bezel is received within the opening; and
    a tether secured to the object, the tether retaining the object with the cover after deployment of the pair of deployable doors along the predetermined tear seam, wherein the object is dislodged from the opening when the pair of deployable doors deploy along the predetermined tear seam.

2. The cover as in claim 1, wherein the object is a horn switch assembly.

3. The cover as in claim 1, wherein one end of the tether is fixedly secured to the object and another end of the tether further comprises a loop portion configured to be placed around a wall portion of the cover and wherein the loop portion is secured to the wall portion without any mechanical fasteners.

4. The cover as in claim 1, wherein one end of the tether further comprises a mounting portion and a securement portion, the mounting portion being coupled to the securement portion by a leg portion, the securement portion being configured to engage another portion of the cover, wherein the another portion of the cover does not become dislodged when the deployable doors deploy along the predetermined tear seam.

5. The cover as in claim 1, wherein one end of the tether further comprises a mounting portion and a securement portion, the mounting portion being coupled to the securement portion by a leg portion and wherein the mounting portion can be received within an opening defined by the securement portion.

6. The cover as in claim 1, wherein one end of the tether is fixedly secured to the object and another end of the tether further comprises at least one pair of openings configured to be positioned over a pair of mounting portions, the mounting portions extending from a side wall of the cover and wherein the at least one pair of openings are secured to the pair of mounting portions without any mechanical fasteners.

7. A cover for a driver's side airbag module, the cover comprising:
    a central body portion having an opening disposed therein, the central body portion having a predetermined tear seam for defining a pair of deployable doors, the predetermined tear seam extending through the opening;
    an object inserted into the opening; and
    a tether having one end fixedly secured to the object and another end defining a loop configured to be placed around a wall portion of the cover, the tether retaining the object with the cover after deployment of the pair of deployable doors along the predetermined tear seam, wherein the object is dislodged from the opening when the pair of deployable doors deploy along the predetermined tear seam.

8. The cover as in claim 7, wherein the object comprises a bezel having a rim portion having a first surface and a second surface and a plurality of tabs extending from the second surface, the plurality of tabs passing through complementary openings in a peripheral portion of the opening and the first surface is flush with an exterior surface of the cover when the bezel is received within the opening.

9. The cover as in claim 7, wherein the object is an emblem.

10. The cover as in claim 7, wherein one end of the tether further comprises a mounting portion and a securement portion, the mounting portion being coupled to the securement portion by a leg portion, the securement portion being configured to engage another portion of the cover, wherein the another portion of the cover does not become dislodged when the deployable doors deploy along the predetermined tear seam.

11. The cover as in claim 7, wherein one end of the tether further comprises a mounting portion and a securement portion, the mounting portion being coupled to the securement portion by a leg portion and wherein the mounting portion can be received within an opening defined by the securement portion.

12. The cover as in claim 7, wherein the object is a horn switch assembly.

13. A driver's side airbag module, comprising:
an inflator;
an inflatable cushion being positioned in the airbag module in an un-inflated state for inflation by the inflator;
a cover for the airbag module, the cover comprising:
a central body portion having an opening disposed therein, the central body portion having a predetermined tear seam for defining a pair of deployable doors, the predetermined tear seam extending through the opening;
an object inserted into the opening; and
a tether secured to the object, the tether retaining the object with the cover after deployment of the pair of deployable doors along the predetermined tear seam, wherein the object is dislodged from the opening when the pair of deployable doors deploy along the predetermined tear seam;
wherein the object includes a bezel having a rim portion with a first surface and a second surface and a plurality of tabs extending from the second surface, the plurality of tabs passing through complementary openings in a peripheral portion of the opening and the first surface is flush with an exterior surface of the cover when the bezel is received within the opening.

14. The driver's side airbag module as in claim 13, wherein the object is a horn switch assembly.

15. The driver's side airbag module as in claim 13, wherein one end of the tether is fixedly secured to the object and another end of the tether further comprises a loop portion configured to be placed around a wall portion of the cover and wherein the loop portion is secured to the wall portion without any mechanical fasteners.

16. The driver's side airbag module as in claim 13, wherein one end of the tether further comprises a mounting portion and a securement portion, the mounting portion being coupled to the securement portion by a leg portion, the securement portion being configured to engage another portion of the cover, wherein the another portion of the cover does not become dislodged when the deployable doors deploy along the predetermined tear seam.

17. The driver's side airbag module as in claim 13, wherein one end of the tether is fixedly secured to the object and another end of the tether further comprises at least one pair of openings configured to be positioned over a pair of mounting portions, the mounting portions extending from a side wall of the cover and wherein the at least one pair of openings are secured to the pair of mounting portions without any mechanical fasteners.

18. A driver's side airbag module, comprising:
an inflator;
an inflatable cushion being positioned in the airbag module in an un-inflated state for inflation by the inflator;
a cover for the airbag module, the cover comprising:
a central body portion having an opening disposed therein, the central body portion having a predetermined tear seam for defining a pair of deployable doors, the predetermined tear seam extending through the opening;
an object inserted into the opening; and
a tether secured to the object, the tether retaining the object with the cover after deployment of the pair of deployable doors along the predetermined tear seam, wherein the object is dislodged from the opening when the pair of deployable doors deploy along the predetermined tear seam;
wherein one end of the tether further comprises a mounting portion and a securement portion, the mounting portion being coupled to the securement portion by a leg portion, the securement portion being configured to engage another portion of the cover, wherein the another portion of the cover does not become dislodged when the deployable doors deploy along the predetermined tear seam.

19. The driver's side airbag module as in claim 18, wherein the object is an emblem comprising a bezel having a rim portion having a first surface and a second surface and a plurality of tabs extending from the second surface, the plurality of tabs passing through complementary openings in a peripheral portion of the opening the cavity and the first surface is flush with an exterior surface of the cover when the bezel is received within the opening and wherein one end of the tether is fixedly secured to the emblem and another end of the tether further comprises a loop portion configured to be placed around a wall portion of the cover.

20. The driver's side airbag module as in claim 19, wherein the object is a control element.

21. The cover as in claim 1, wherein the object is an emblem.

22. The driver's side airbag module as in claim 13, wherein the object is an emblem.

* * * * *